United States Patent [19]

Dauw

[11] Patent Number: 4,700,038
[45] Date of Patent: Oct. 13, 1987

[54] METHOD AND APPARATUS FOR MEASURING THE RATE OF WEAR OF AN EDM ELECTRODE TOOL

[75] Inventor: Dirk Dauw, Gland, Switzerland

[73] Assignee: Charmilles Technologies SA - Geneva, Geneva, Switzerland

[21] Appl. No.: 836,408

[22] Filed: Mar. 5, 1986

[30] Foreign Application Priority Data

Mar. 5, 1985 [CH] Switzerland .................. 00983/85

[51] Int. Cl.$^4$ ............................................. B23H 1/02
[52] U.S. Cl. ............................... 219/69 P; 219/69 M; 219/69 C
[58] Field of Search ............... 219/69 M, 69 P, 69 C, 219/69 R

[56] References Cited

U.S. PATENT DOCUMENTS

| | | | |
|---|---|---|---|
| 3,739,137 | 6/1973 | Marendaz | 219/69 M |
| 3,892,936 | 7/1975 | Kobayashi et al. | 219/69 M |
| 4,335,294 | 6/1982 | Inoue | 219/69 M |
| 4,436,976 | 3/1984 | Inoue | 219/69 M |
| 4,527,034 | 7/1985 | Inoue et al. | 219/69 C |
| 4,539,458 | 9/1985 | Inoue | 219/69 M |

OTHER PUBLICATIONS

"Predicting the Required Working Length of Parallel EDM Electrodes", Klados, pp. 8-16 *EDM Digest*, Jan.-/Feb. 1984, vol. VI, No. 1.
"New Developments in EDM Presented at ISEM 7", Wijers, pp. 20-26 *EDM Digest*, Jan./Feb. 1984, vol. VI, No. 1.
"How the EDM Process Can be Improved", Mironoff pp. 8-15, 25 *EDM Digest*, Sep./Oct. 1984, Vol. VI, No. 5.

*Primary Examiner*—A. D. Pellinen
*Assistant Examiner*—Geoffrey S. Evans
*Attorney, Agent, or Firm*—Gifford, Groh, VanOphem, Sheridan, Sprinkle and Dolgorukov

[57] ABSTRACT

The electrode wear rate is determined by using two detectors and a clock to measure the time taken for the voltage across the gap to drop between two preset values which are chosen to measure the speed in which the voltage drops from the no load voltage to the cutting voltage. This value of time is used by an arithmetic circuit which uses an exponential equation to determine the amount of material removed in a single discharge. A second arithmetic circuit is used to sum up the amount of electrode wear taking place and to supply the pulse generator with a control signal for adjusting the pulse generator as a function of the electrode wear rate.

21 Claims, 2 Drawing Figures

METHOD AND APPARATUS FOR MEASURING THE RATE OF WEAR OF AN EDM ELECTRODE TOOL

BACKGROUND OF THE INVENTION

Methods are known for controlling electrical discharge machining of an electrode workpiece by means of an electrode tool, voltage pulses being applied between the electrodes such as to trigger machining electrical discharges, according to which a magnitude characteristic of the speed at which the machining voltage and/or current vary is measured as soon as the machining electrical discharge is triggered.

It is also known that the electrode tool wear is also one of the machining characteristics which, until the present invention, was not possible to measure.

SUMMARY OF THE INVENTION

The present invention has for its principal object to remedy the lack of an adequate apparatus and method capable of measuring each electrical discharge the rate of wear of the electrode tool in an EDM apparatus.

The method of the invention provides a signal which is representative of the volume of material removed from the electrode tool by utilizing a function of the characteristic magnitude of the speed at which vary the machining voltage and/or current at the moment when an electrical discharge occurs.

The diverse objects and advantages of the invention will become apparent to those skilled in the art when the following description of the best mode contemplated at the present for practicing the invention is read in conjunction with the accompanying drawing, illustrating schematically an example of a structure permitting the practice of the method of the invention, and in which:

DETAILED DESCRIPTION OF THE PREFERRED EMBODIMENT

Figure 1:
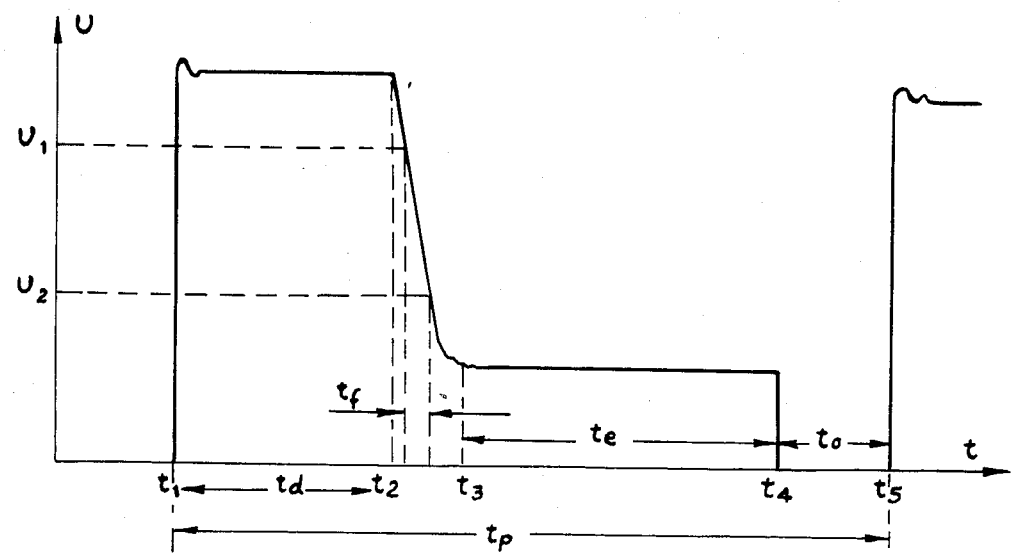
FIG. 1 is a schematic diagram illustrating the principle of the invention.

The diagram of FIG. 1 illustrates the waveform of the machining voltage pulse between the electrode tool and the electrode workpiece in the course of an electrical discharge. A voltage is applied across the electrodes at time $t_1$ and that voltage is maintained during a waiting or delay period $t_d$ up to time $t_2$ when the triggering of the electrical discharge occurs. Current progressively increases while simultaneously the voltage decreases up to time $t_3$, at which time the conditions of electrical discharge become stable. At time $t_4$ the pulse is interrupted, until time $t_5$ when the next pulse begins.

It has been discovered that the speed at which the voltage decreases from $t_2$ to $t_3$ allows determination of the efficiency of the electrical discharge, and therefore to develop a signal which is representative of the volume of material removed from the electrode tool, it being assumed that the electrode tool has a positive polarity. In order to develop such a signal, the moment when the instantaneous voltage value is equal to $U_1$ is controlled together with the moment when the instantaneous voltage is equal to $U_2$, and the time $t_f$ taken by the voltage to drop from $U_1$ to $U_2$ is measured, which in turn determines the slope of the voltage drop. For a given voltage drop from $U_1$ to $U_2$ the smaller the $t_f$, the greater the wear of the positive electrode tool.

With respect to the pulse waveform shown at FIG. 1, it is to be noted that the material removal on the positive electrode is produced between $t_2$ and $t_3$, mainly during the time $t_f$. On the other hand, the material removal on the negative electrode is produced during the discharge, i.e. between $t_3$ and $t_4$, the duration of the discharge current is designated by $t_e$.

A quantitative representation of the material removal from a positive electrode is given by the equation $$\Delta q = e^{-t_f/k}$$

Wherein $\Delta q$ is the quantity of the material removed in the course of one discharge, $t_f$ is the time taken for the voltage to drop from $U_1$ to $U_2$, and k is a constant which is a function of the voltaic cell formed by the metals of the electrode tool and the electrode workpiece.

A characteristic value $U_R$ defining the relative wear between the positive and the negative electrode is obtained by the following equation:

$$U_R = K_R \frac{\sum_1^n e^{-t_f/k}}{\sum_1^n t_e}$$

in which:

$K_R$ is a constant corresponding to the couple of metals of the positive and the negative electrode.

$t_e$ is the duration of the discharge current.

A characteristic value $U_V$ defining the volumetric wear of the positive electrode is determined by the equation:

$$U_V = K_V \frac{\sum_1^n e^{-t_f/k}}{\sum_1^n t_p}$$

Figure 2:
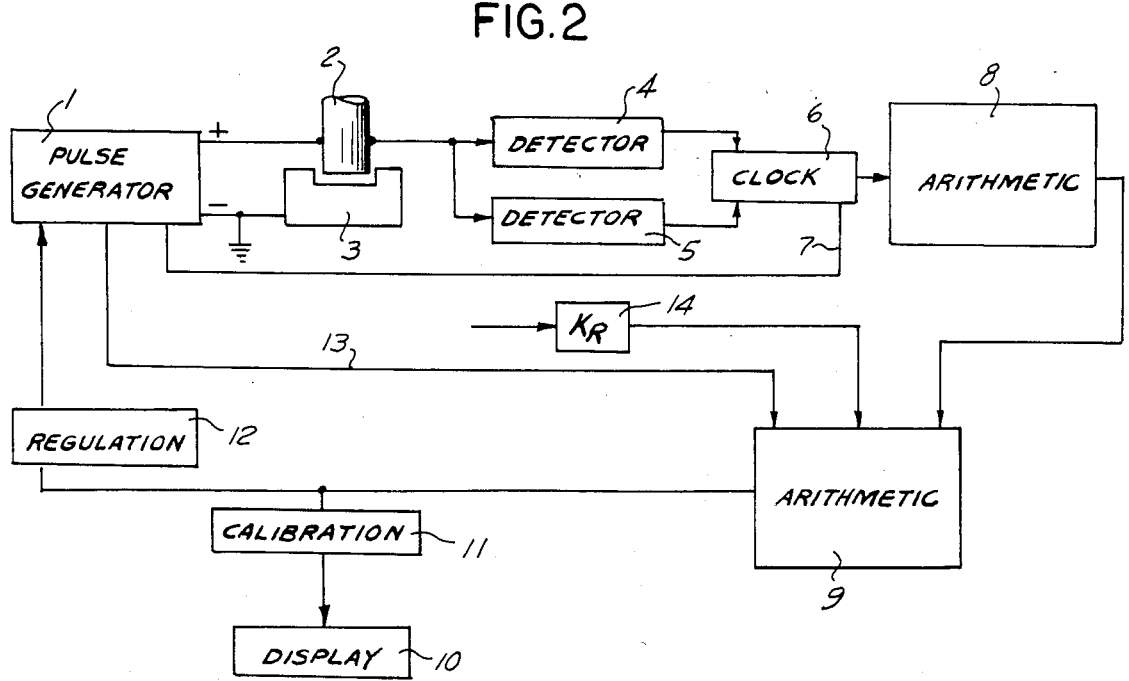
FIG. 2 is an electrical schematic of the apparatus for practicing the invention.

The apparatus illustrated at FIG. 2 comprises a pulse generator 1 applying electrical pulses between an electrode tool 2 and an electrode workpiece 3, the electrode workpiece 3 being connected to ground. The voltage at the electric tool 2 is applied to two detectors 4 and 5, biased for providing an output signal when the voltage is equal respectively to $U_1$ and $U_2$. The signal at the output of each of the two detectors 4 and 5 is applied to a clock 6 that measures the time taken by the voltage to drop from $U_1$ to $U_2$, which represents the slope of the voltage drop. The clock 6 is connected to the pulse generator 1 via a line 7 for resetting the clock to zero, the resetting of the clock 6 to zero taking place at the end of each pulse. The output of the clock 6 is applied to an arithmetic circuit 8 which provides the value $\Delta q$. The value $\Delta q$ is applied to a second arithmetic circuit 9 which supplies at its output a signal $U_V$ which is applied to a display 10 through a calibrating circuit 11 capable of setting the display 10 according to different values, for example to mm$^3$/min. If the arithmetic circuit 9 is set to give the value $U_R$, the calibrating circuit 11 may be set to obtain the display of the relative wear, for example in percent (i.e. to obtain the percent of the positive electrode wear relative to the negative electrode wear). The output of the arithmetic circuit 9 is applied through a circuit 12 permitting regulation of the parameters and piloting the generator 1 according to the desired result. For this purpose the circuit 12 is set, by means not shown, in order to supply to the generator 1 the setting signals desired by the operator. For example, the operator may obtain a minimum of wear for the electrode 2 for a given rate of material removal from the workpiece 3. It is also possible to set the maximum discharge current with respect to the desired roughness of the machined surfaces. The circuit 12 may be constituted by a micro-computer acting on the generator 1 for setting the current amplitude of each discharge, the duration of the discharge, the duration of $t_0$, i.e. the time between $t_4$ and $t_5$, the frequency of the discharges and so on.

The generator 1 is connected to the arithmetic circuit 9 by a line 13 for introducing the value of the parameters set by the circuit 12, for example $t_e$, $t_p$ and $t_0$. A circuit 14 supplies the arithmetic circuit 9 with a signal defining the constant $K_R$ corresponding to the metals of the positive and negative electrodes.

Having thus described the present invention by way of an example of structure for practicing the invention, given for illustrative purpose only, modifications whereof will be apparent to those skilled in the art, what is claimed as new is as follows:

1. In a method for controlling electrical discharge machining of an electrode workpiece by means of an electrode tool, wherein consecutive voltage pulses are applied across said electrodes for triggering electrical discharges, said method comprising measuring a magnitude representative of the speed at which varies the machining voltage during triggering of said electrical discharge, the improvement comprising developing a signal representative of the volume of material removed from the electrode of a positive polarity as a function of said magnitude.

2. The method of claim 1 wherein an exponential function of said magnitude is developed.

3. The method of claim 1 wherein said function is adjusted relative to machining parameters and the voltaic cell formed by the materials of the electrodes.

4. In a method for controlling electrical discharge machining of an electrode workpiece by means of an electrode tool, wherein consecutive voltage pulses are applied across said electrodes for triggering electrical discharges, said method comprising measuring a magnitude representative of the speed at which varies the machining current during triggering of said electrical discharge, the developing a signal representative of the volume of material removed from the electrode of a positive polarity as a function of said magnitude.

5. The method of claim 4 wherein an exponential function of said magnitude is developed.

6. The method of claim 4 wherein said function is adjusted relative to machining parameters and the voltaic cell formed by the materials of the electrodes.

7. The method of claim 4 wherein said magnitude is representative of the speed at which vary both the machining voltage and current.

8. The method of claim 7 wherein an exponential function of said magnitude is developed.

9. The method of claim 7 wherein said function is adjusted relative to machining parameters and the voltaic cell formed by the materials of the electrodes.

10. An apparatus for controlling electrical discharge machining of an electrode workpiece by means of an electrode tool, wherein consecutive voltage pulses are applied across said electrode for triggering electrical discharges, said apparatus comprising a pulse generator connected across said electrodes, a circuit for producing a signal representing the speed at which the machining voltage varies during triggering of the electrical discharge, and a circuit for developing a signal representing the volume of material removed from the electrode tool as a function of said signal.

11. The apparatus of claim 10 further comprising a circuit for measuring the time period of a machining electrical discharge and a circuit for dividing said function by said time period.

12. The apparatus of claim 10 further comprising a circuit for adjusting machining parameters as a function of said volume of material removed from the electrode tool.

13. The apparatus of claim 11 further comprising a circuit for adjusting machining parameters as a function of said volume of material removed from the electrode tool.

14. The apparatus of claim 10 further comprising a circuit for adjusting machining parameters as a function of said volume of material removed from the electrode tool.

15. The apparatus of claim 10 further comprising a circuit for measuring the time period of a machining electrical discharge and a circuit for dividing said function by said time period.

16. The apparatus of claim 10 further comprising a circuit for adjusting machining parameters as a function of said volume of material removed from the electrode tool.

17. The apparatus of claim 11 further comprising a circuit for adjusting machining parameters as a function of said volume of material removed from the electrode tool.

18. The apparatus of claim 15 wherein said signal is representing the speed at which both the machining voltage and current vary.

19. The apparatus of claim 18 further comprising a circuit for measuring the time period of a machining electrical discharge and a circuit for dividing said function by said time period.

20. An apparatus for controlling electrical discharge machining of an electrode workpiece by means of an electrode tool, wherein consecutive voltage pulses are applied across said electrode for triggering electrical discharges, said apparatus comprising a pulse generator connected across said electrodes, a circuit for producing a signal representing the speed at which the machining current varies during triggering of the electrical discharge, and a circuit for developing a signal representing the volume of material removed from the electrode tool as a function of said signal.

21. The apparatus of claim 14 further comprising a circuit for adjusting machining parameters as a function of said volume of material removed from the electrode tool.

* * * * *

UNITED STATES PATENT AND TRADEMARK OFFICE
CERTIFICATE OF CORRECTION

PATENT NO. : 4,700,038
DATED : October 13, 1987
INVENTOR(S) : Dirk Dauw

It is certified that error appears in the above-identified patent and that said Letters Patent is hereby corrected as shown below:

Col. 1, line 22 after "measuring", insert --for--.

Col. 3, line 53 after "the" first occurrence, insert --improvement comprising--.

Signed and Sealed this

Twenty-second Day of March, 1988

Attest:

DONALD J. QUIGG

Attesting Officer

Commissioner of Patents and Trademarks